United States Patent
Weiland et al.

(10) Patent No.: US 11,808,162 B2
(45) Date of Patent: Nov. 7, 2023

(54) TURBINE HOUSING FOR AN EXHAUST GAS TURBOCHARGER

(71) Applicant: BorgWarner Inc., Auburn Hills, MI (US)

(72) Inventors: Tim Weiland, Worms (DE); Alexander Umlauff, Framersheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/899,954

(22) Filed: Aug. 31, 2022

(65) Prior Publication Data
US 2023/0147046 A1    May 11, 2023

(30) Foreign Application Priority Data

Nov. 8, 2021  (DE) .......................... 202021106090.5

(51) Int. Cl.
  *F01D 25/24*    (2006.01)
  *F01D 9/02*     (2006.01)
  *F02C 6/12*     (2006.01)

(52) U.S. Cl.
  CPC ............ *F01D 25/24* (2013.01); *F01D 9/026* (2013.01); *F02C 6/12* (2013.01); *F05D 2220/40* (2013.01); *F05D 2240/14* (2013.01); *F05D 2250/15* (2013.01); *F05D 2250/711* (2013.01)

(58) Field of Classification Search
  CPC ...... F01D 25/24; F01D 9/026; F05D 2220/40; F05D 2240/14; F05D 2250/15; F05D 2250/711; F04D 29/4206; F02C 6/12
  See application file for complete search history.

(56) References Cited

U.S. PATENT DOCUMENTS

| | | | | |
|---|---|---|---|---|
| 6,729,134 B2 * | 5/2004 | Arnold | ..................... | F01D 5/141 415/164 |
| 6,742,989 B2 * | 6/2004 | Osako | ..................... | F01D 9/026 416/185 |
| 7,762,067 B2 * | 7/2010 | Bouvier | ..................... | F02C 6/12 415/157 |
| 8,266,906 B2 * | 9/2012 | Wu | ......................... | F02B 37/00 60/605.1 |
| 8,632,304 B2 * | 1/2014 | Sweetland | .............. | F01D 9/026 415/204 |
| 9,194,256 B2 * | 11/2015 | Purdey | .................. | F01D 25/186 |
| 9,328,738 B2 * | 5/2016 | Yokoyama | ................ | F02C 6/12 |
| 2017/0044925 A1 * | 2/2017 | Myers | ..................... | F01D 9/048 |

* cited by examiner

*Primary Examiner* — Brian P Wolcott
(74) *Attorney, Agent, or Firm* — Howard & Howard Attorneys PLLC

(57) ABSTRACT

A turbine housing for an exhaust turbocharger is configured for receiving a turbine wheel rotatable about an axis. The housing includes an exhaust gas inlet, an exhaust gas outlet pointing in an outlet direction, and a single-flow, spiral exhaust gas routing. The routing has a volute and a volute outlet gap configured so that exhaust gas flows from the volute to the wheel. The routing is fluidically connected to the inlet and is defined by an internal wall of the housing. The volute has a portion which encircles the axis and has a convexity of the internal wall. The convexity, counter to the outlet direction, extends beyond the volute outlet gap. Further, sectional faces, through which the axis runs, each have a volute contour with a straight linear portion. The linear portion, conjointly with the axis, defines an angle facing the outlet that is less than or equal to 90°.

15 Claims, 3 Drawing Sheets

TURBINE HOUSING FOR AN EXHAUST GAS TURBOCHARGER

CROSS-REFERENCE TO RELATED APPLICATIONS

This application claims priority pursuant to 35 U.S.C. 119(a) to German Patent Application No. 202021106090.5 filed Nov. 8, 2021, which application is incorporated herein by reference in its entirety.

BACKGROUND

The invention relates to a turbine housing for an exhaust turbocharger.

An exhaust turbocharger comprises a turbine and a compressor. The turbine converts energy from exhaust gas into mechanical energy for driving a compressor. The turbine, driven by the exhaust gas of an internal combustion engine, supplies driving energy for the compressor in that the exhaust gas drives a turbine wheel of the turbine, the rotation of the turbine wheel by way of the shaft being transmitted to a compressor wheel of the compressor, the latter compressing air for the internal combustion engine.

The turbine of the exhaust turbocharger comprises a turbine housing which receives the turbine wheel and in which the latter rotates. In a radial turbine, the inflow takes place in the radial direction from the outside to the inside, and the outflow takes place in the axial direction. The turbine housing on the rear side is connected to a bearing housing in which the shaft that drives the compressor rotates.

A conventional turbine housing comprises a spiral volute by way of which entering exhaust gas is directed about the turbine wheel, and an arcuate volute outlet gap which runs about the turbine wheel and through which the exhaust gas flows from the volute to the turbine wheel. A B-type volute has a cross section with a straight rear side and an arcuate front side which extends in an outlet direction of the exhaust gas, wherein the straight rear side opens into a straight, or radially running volute outlet gap such that a substantial proportion of the turbine housing material is concentrated on the rear side of the turbine housing that faces the bearing housing. As a result of the design of the turbine housing with a straight rear wall interior as described above, a direct inflow of the exhaust gas results on that side of the turbine housing that faces the bearing housing.

SUMMARY

The object is based on providing an improved turbine housing.

The object is achieved by a turbine housing having the features of claim 1.

The turbine housing for an exhaust turbocharger is configured for receiving a turbine wheel that is rotatable about an axis. The turbine housing comprises an exhaust gas inlet, an axial exhaust gas outlet pointing in an outlet direction, and a single-flow, spiral exhaust gas routing having a volute and a volute outlet gap, the latter being configured so that exhaust gas flows from the volute to the turbine wheel, wherein the exhaust gas routing is fluidically connected to the exhaust gas inlet and is defined by an internal wall of the turbine housing. The volute has a portion which encircles the axis and has a convexity of the internal wall, in that the convexity, counter to the outlet direction, extends beyond the volute outlet gap, and in that sectional faces through which the axis runs each have a volute contour with a straight linear portion, wherein the straight linear portion conjointly with the axis defines an angle facing the exhaust gas outlet that is less than or equal to 90°.

The outlet direction advantageously runs parallel to the axis about which the turbine wheel rotates. The turbine housing has a funnel-shaped exhaust gas inlet which is fluidically connected to an exhaust gas routing such that the exhaust gas flows through the exhaust gas inlet into the exhaust gas routing. The exhaust gas routing is single-flow, which is also referred to as a "monoscroll". The exhaust gas routing extends in the shape of a spiral about a central region in which the turbine wheel is received. The volute outlet gap runs in the shape of a ring or an arc and connects the central region for the turbine wheel to the volute such that the exhaust gas guided about the turbine wheel can flow radially onto the turbine wheel and as a result can drive the latter. The volute outlet gap advantageously runs in a plane that is perpendicular to the axis. The volute outlet gap extends radially, and in an arcuate manner encircles the axis. Vanes for directing the exhaust gas flow can be provided in the volute outlet gap. The vanes can be adjustable.

The convexity counter to the outlet direction is an extent of the volute in the direction of the bearing housing, the latter being able to be connected to the turbine housing. In comparison to the volute of a conventional embodiment, this axial deformation permits a smaller extent of the volute in the radial direction, i.e. perpendicular to the axis, without the performance of the embodiment according to the invention being reduced in comparison to the conventional embodiment. This is associated with a smaller installation size, a smaller radial extent and a lower weight of the turbine housing according to the invention, as is constantly desired by customers. Nevertheless, already existing specifications and standards and production methods can be maintained despite the smaller installation size, while simultaneously maintaining or improving the performance.

The volute in the portion having the convexity also has a flattened region on its rear side that faces away from the exhaust gas outlet. A straight linear portion of a volute contour is in this region, whereby the straight linear portion runs from the convexity so as to be perpendicular to the axis, or in particular runs from the convexity so as to be angular in relation to the axis, such that the straight linear portion is inclined in relation to the exhaust gas outlet. The volute contour is the line of the internal wall in a section through the exhaust gas routing such that the axis runs through the sectional face. While there are two volute contours in such a plane, the two volute contours do not necessarily have to lie within the portion and do not necessarily have to have a straight linear portion.

The straight linear portion is advantageously a region of the volute contour that faces away from the exhaust gas outlet, such that the straight linear portion faces the bearing housing and the region of the volute contour that faces the exhaust gas outlet is radiused. The straight linear portions shape the flattened region on the rear side of the volute. The flattened region advantageously influences the flow behavior of the exhaust gas. The straight linear portion can run on a side of a line that faces away from the exhaust gas outlet and that runs along a region of a volute outlet gap contour perpendicularly to the axis such that the straight linear portion is entirely or partially to the rear of the line. This line can in particular run along a region of a volute outlet gap contour that faces away from the exhaust gas outlet such that the straight linear portion beyond the volute outlet gap is on the side of the housing that faces the bearing housing. The flattened region thus runs at the rear of the volute outlet gap.

The volute contour beyond the volute outlet gap and the straight linear portion is advantageously configured so as to be radiused.

A coupling device is advantageously provided on the rear side of the turbine housing, the coupling device being disposed so as to face away from the exhaust gas outlet and configured for connecting the turbine housing to a bearing housing.

In one embodiment, the portion which encircles the axis and has the clearance and the flattened region extends in an arcuate manner between a beginning and an end, wherein the beginning and the end between the axis define an angle of at least 90°, in particular at least 120° and most particularly at least 180°. The region having the convexity thus extends along a major part of the exhaust gas routing but not necessarily up to the end of the latter. The beginning of the region can be directly after the exhaust gas inlet proceeding from which the exhaust gas routing extends.

In one embodiment, a length of the straight linear portion decreases as the encirclement of the axis increases, such that the flattened region tapers as the encirclement increases. A depth by way of which the convexity extends beyond the volume outlet gap can also decrease as the encirclement of the axis increases. In an embodiment of an exhaust gas routing that is encircling up to a tongue, the volute contour in a sectional face on the tongue end region through which the axis runs would in this instance no longer have a straight linear region, or no longer have a convexity.

BRIEF DESCRIPTION OF THE DRAWINGS

A few exemplary embodiments will be explained in more detail hereunder by means of the drawing. In the drawing.

In the figures, identical or functionally equivalent components are provided with the same reference signs.

DETAILED DESCRIPTION

Figure 1:
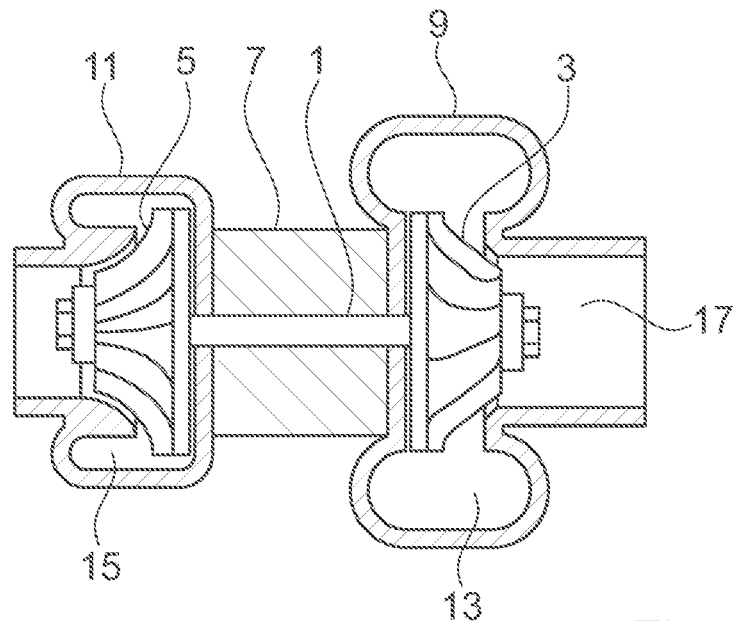
FIG. 1 shows a schematic illustration of an exhaust turbocharger.

FIG. 1 shows a schematic illustration of an exhaust turbocharger having a turbine wheel 3 and a compressor wheel 5, the turbine wheel 3 and the compressor wheel 5 being connected by way of a shaft 1. The exhaust turbocharger comprises a bearing housing 7, a turbine housing 9 and a compressor housing 11. The turbine housing 9 receives the turbine wheel 3, the compressor housing 11 receives the compressor wheel 5, and the shaft 1 is rotatably mounted in the bearing housing 7. The turbine housing 9 as well as the compressor housing 11 have spiral volutes 13, 15 by way of which exhaust gas is guided to the turbine wheel 3, or compressed air is discharged from the compressor wheel 5, respectively.

A turbine, driven by exhaust gas of an internal combustion engine, supplies driving energy for a compressor. The exhaust gas of the internal combustion engine drives the turbine wheel 3, the rotation of the latter by way of the shaft 1 being transmitted to the compressor wheel 5, the rotation of the latter compressing air supplied to the internal combustion engine. The exhaust gas by way of the volute 13 flows radially onto the turbine wheel 3 and is axially output through an exhaust gas outlet 17. The air flows axially onto the compressor wheel 5 and is discharged radially by way of the volute 15 and then guided to the internal combustion engine.

Figure 2:
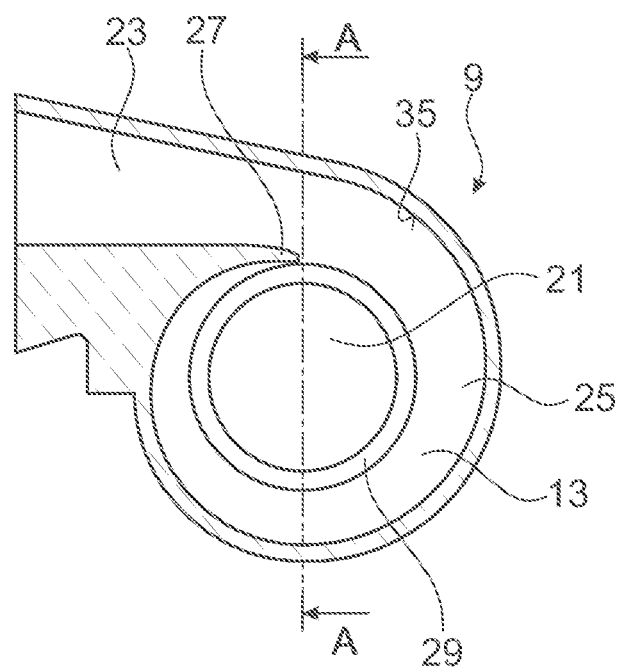
FIG. 2 shows a sectional illustration through an exemplary embodiment of a turbine housing.

FIG. 2 shows a sectional illustration through an exemplary embodiment of a turbine housing 9 which in the central region 21 thereof is configured for receiving a turbine wheel 3 (not illustrated in FIG. 2) that is rotatable about an axis 19. The axis 19 runs perpendicularly to the drawing plane.

The turbine housing 9 has an exhaust gas inlet 23, an exhaust gas routing 25 and an exhaust gas outlet 17. The exhaust gas inlet 23 is a funnel-shaped region through which exhaust gas flows into the turbine housing 9. The exhaust gas inlet 23 transitions to the single-flow, spiral exhaust gas routing 25 such that the exhaust gas inlet 23 and the exhaust gas routing 25 are fluidically connected. The exhaust gas inlet 23 as well as the exhaust gas routing 25 are formed by internal walls 35 of the turbine housing 9. The exhaust gas routing 25 in the shape of a spiral encircles the axis 19 and winds itself once about the central region 21 for the turbine wheel 3. An end region of the exhaust gas routing 25 which is wound about the central region 21 is separated from the funnel-shaped exhaust gas inlet 23 by a tongue 27. The tip of the tongue defines the transition from the exhaust gas inlet 23 to the exhaust gas routing 25, the transition in FIG. 2 being in the upper region of the line A-A. A cross section of the exhaust gas routing 25 tapers in the encirclement, wherein the cross section is in a sectional plane through which the axis 19 runs. The exhaust gas routing has a volute 14 and, between the volute 13 and the central region 21, an annular volute outlet gap 29 such that the exhaust gas can flow through the volute outlet gap 29 onto the turbine wheel 3. The exhaust gas outlet 17 extends axially to the central region 21 and is configured for discharging the exhaust gas once the latter has flowed across the turbine wheel 3.

Figure 3:
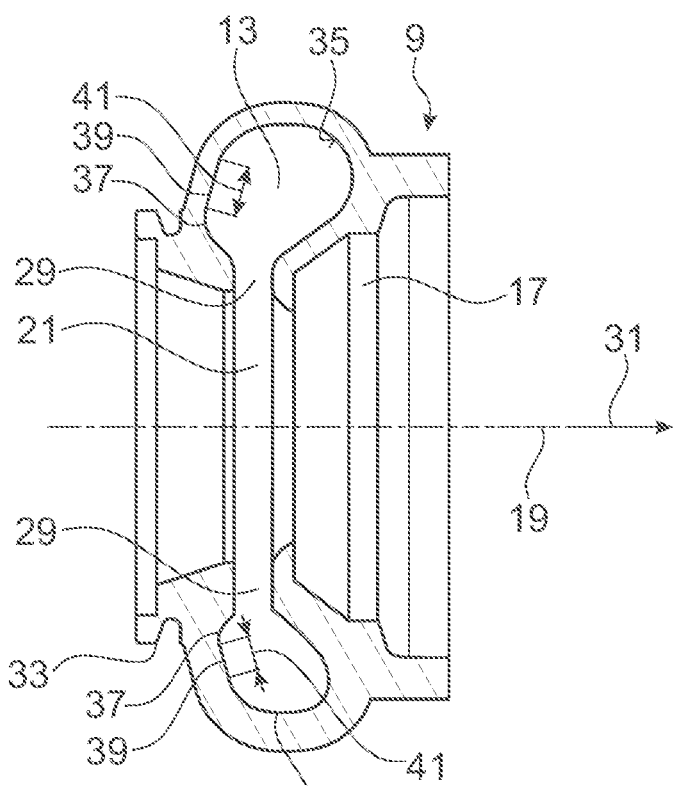
FIG. 3 shows a further sectional illustration through the turbine housing.

FIG. 3 shows a schematic sectional illustration through the turbine housing 9 along a line A-A which is illustrated in FIG. 2.

The turbine housing 9 has a front side and a rear side. The exhaust gas outlet 17 which extends in an outlet direction 31, which is advantageously parallel to the axis 19, is disposed on the front side. The turbine wheel 3 (not illustrated in FIG. 3) is received in the central region 21, the exhaust gas outlet 17 extending across the latter, such that the turbine wheel 3 is rotatable about the axis 19. The exhaust gas flows away from the turbine wheel 3 in the outlet direction 31.

A connection device 33, which is configured for connecting the turbine housing 9 to a bearing housing 7 (not illustrated in FIG. 3) is provided on the rear side, the latter facing away from the exhaust gas outlet 17. The connection device 33 has an encircling flange and is configured such that the connection device 33 by means of a clamp with a V-profile is connectable to the bearing housing 7.

The exhaust gas routing 25, which is defined by the internal wall 35 of the turbine housing 9, in the shape of a spiral runs about the central region 21. The exhaust gas routing 25 comprises the volute 13 and the volute outlet gap 29 which from the volute 13 extends radially to the central region 21 and is configured such that the exhaust gas, which is guided about the turbine wheel 3 by the volute 13, can flow from the volute 13 onto the turbine wheel 3.

The section in FIG. 3 shows two opposite regions of the volute 13 of dissimilar sizes, because the cross-sectional area of the volute 13 decreases as the encirclement increases.

The volute 13 comprises a portion 45 which encircles the axis 19 and has a convexity 37. The convexity 37 of the internal wall 35, counter to the outlet direction 31, extends beyond the volute outlet gap 29. A depth by way of which the convexity 37 extends beyond the volute outlet gap 29 decreases as the encirclement increases, until the depth vanishes entirely. This may be the case after approx. 200°±15°, for example. Moreover, the volute 13 in the portion 45 is flattened in such a manner that a volute contour in sectional faces through which the axis 19 runs has a straight linear portion 39. The straight linear portion 39 runs from the convexity 37 at an angle to the axis 19 such that the straight linear portion 39 is inclined in relation to the exhaust gas outlet 17. In other words, the straight linear portion 39 conjointly with the axis 19 defines an angle facing the exhaust gas outlet 17 that is less than or equal to 90°. The volute contour is the profile of the internal wall 35 that defines the volute 13 in the sectional plane. A length 41 of the straight linear portion 39 decreases as the encirclement of the volute 13 increases, until the straight linear portion 37 vanishes entirely. The same applies to the flattened region which is formed by the straight linear portions 37 and which tapers as the encirclement of the volute 13 increases. In both cases, this may be after approx. 200°±15°. The convexity 37 and the flattened region do not necessarily have to vanish at the same location.

As a result of the convexity 37 of the volute 13 in the direction of the bearing housing 7, the thermally induced stress during repeated heating and cooling is also reduced such that the thermomechanical fatigue and thus the tendency toward cracking is reduced.

Figure 4:
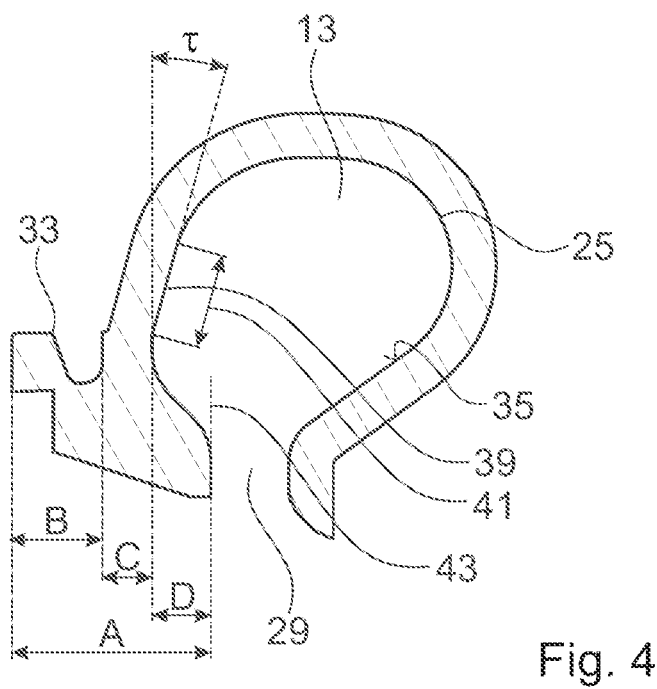
FIG. 4 shows a sectional illustration through an exemplary embodiment of an exhaust gas routing.

FIG. 4 shows a section through the beginning of the exhaust gas routing 25 for an exemplary embodiment, wherein the axis 19 runs through the sectional plane. The exhaust gas outlet 17 is not illustrated for the sake of clarity. The sectional plane is directly behind the exhaust gas inlet 23.

The exhaust gas routing 25 can be defined by means of various parameters. A is the spacing between the rear side and the volute outlet gap 29, more specifically the rear side of the latter. The spacing A is defined between lines that are perpendicular to the axis 19. The spacing A is the width on the rear side of the turbine housing contour. B is the width of the fastening device 33 for the clamp with the V-profile and comprises the flange that is encompassed by the clamp. C is the wall thickness without the fastening device 33. The afore-mentioned parameters are pre-defined substantially by the frame size of the exhaust turbocharger.

Further parameters are D as the width of the elevation between the rear side of the volute outlet gap 29 and the apex of the convexity 37, and the angle τ between the line perpendicular to the axis 19 at the apex of the convexity 37 and the straight portion 39. D is the depth by way of which the convexity 37 protrudes beyond the volute outlet gap 29. D and τ can be optimized so as to influence the flow-directing properties of the volute 13. The regions beyond the volute outlet gap 29 and the straight linear portions 39 are advantageously radiused. In one exemplary embodiment the parameters are as follows: A is 16.3 mm±0.3 mm, B is 8 mm, C is at least 4 mm, and variable D is at most 4 mm. In another exemplary embodiment the parameters are as follows: A is 20.2 mm±0.3 mm, B is 10 mm, C is at least 4 mm, and variable D is at most 4.5 mm.

The convexity 39 arises in a portion 45 which encircles the axis 19 and in an arcuate manner extends between the beginning of the exhaust gas routing 25 and an end. The beginning and the end between the axis 19 define an angle of approx. 200°±15°. The length of the straight linear portion 37 decreases as the encirclement of the axis 19 increases. Likewise, the depth, i.e. D, by way of which the convexity 37 extends beyond the volute outlet gap 29, decreases as the encirclement of the axis 19 increases. The flattened region having the straight linear portions 39 is on the rear side of the volute outlet gap 29, i.e. at least partially to the rear of a line 43 which along a volute outlet gap contour on the rear side runs perpendicularly to the axis 19, the parameters A and D also extending up to the line 43. In an alternative embodiment, the flattened region may also extend beyond the volute outlet gap 29, specifically to the rear of a line which along a volute outlet gap contour on the front side runs perpendicularly to the axis 19. The exhaust gas routing 25 runs up to the tongue 27, wherein the volute contour in a sectional face on the tongue end region, through which the axis 19 runs, no longer has a straight linear region 39 and the convexity 37 has also vanished such that the volute contour extends away from the volute outlet gap 29 in a straight manner.

Figure 5:
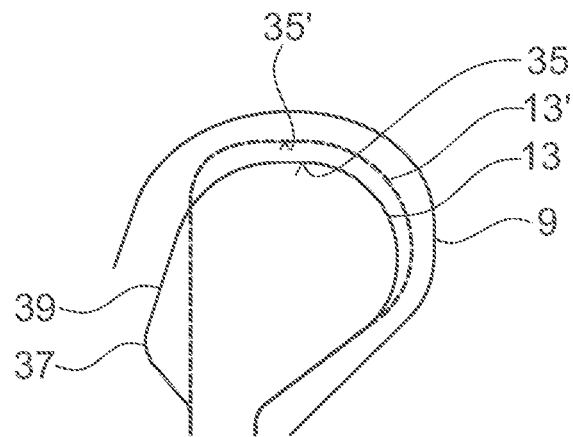
FIG. 5 shows exemplary embodiments of volutes of an exemplary embodiment according to the invention and of a conventional exemplary embodiment in a schematic sectional illustration.

FIG. 5 schematically visualizes the difference between an exemplary embodiment of a volute 13 according to the invention and a conventional B-type volute 12' without a convexity 37. Volute contours of the internal wall 35, 35' for the exemplary embodiment according to the invention are illustrated as solid lines and for the conventional exemplary embodiment as dashed lines, respectively. The outer solid line visualizes the wall thickness of the exemplary embodiment according to the invention. While the two exemplary embodiments in terms of the cross-sectional area thereof have only minor differences, the radial extent relative to the axis 19 of the exemplary embodiment according to the invention is smaller, since the conventional exemplary embodiment with the identical wall thickness would extend further in the radial direction because the volute 13' of the conventional exemplary embodiment also extends further in the radial direction. Moreover, a radius of the center of gravity of the exemplary embodiment according to the invention, by virtue of the convexity 37, is closer to the axis 19, this being associated with an improved performance.

Figure 6:
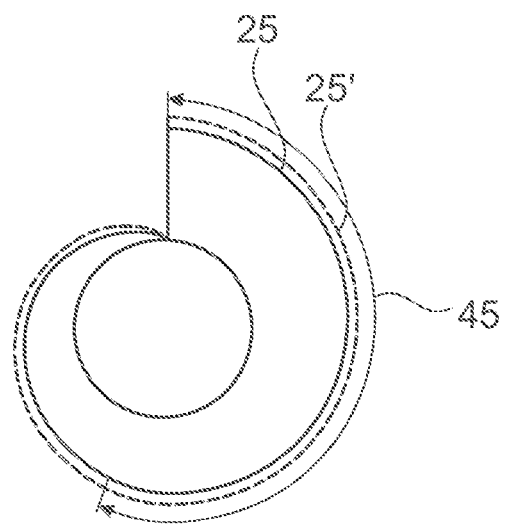
FIG. 6 shows exemplary embodiments of volutes of an exemplary embodiment according to the invention and a conventional exemplary embodiment in a further schematic sectional illustration.

FIG. 6 schematically shows a section through the exhaust gas routing 25, 25', perpendicular to the axis 19, of an exemplary embodiment according to the invention and of a conventional exemplary embodiment with the same performance. The exemplary embodiment of the exhaust gas routing 25 according to the invention is illustrated by solid lines, while the conventional exemplary embodiment of the exhaust gas routing 25' is illustrated by dashed lines. The radial extent along the entire volute profile is smaller in the case of the exemplary embodiment according to the invention.

Moreover schematically visualized in FIG. 6 is an exemplary extent of the portion 45 which encircles the axis and has the convexity 37 and the straight linear portions 39, between the beginning of the portion 45 at the beginning of the exhaust gas routing and at the end of the portion 45 after approx. 200°.

The smaller extent in the radial direction is associated with a smaller installation size and a lower weight of the turbine housing 9 according to the invention. This also leads to less material being required for the turbine housing 9.

Nevertheless, the turbine housing 9 according to the invention can adhere to pre-defined dimensions and be produced in the same way as a convention turbine housing, and at the same time still have a smaller installation size with an identical or improved performance. Typical values for the material savings for a turbine wheel 3 of 45 mm are 100 g in saved materials, and 450 g in saved materials for a turbine wheel of 67 mm. Depending on the material used and the turbine size, material savings of approximately 60 g to 450 g are thus possible. This is also associated with cost savings.

The features which are set forth above and in the claims, and which can be derived from the illustrations, can be advantageously implemented individually as well as in various combinations. The invention is not limited to the exemplary embodiments described but may be modified in many ways within the scope of the ability of a person skilled in the art.

LIST OF REFERENCE SIGNS

1 Shaft
3 Turbine wheel
5 Compressor wheel
7 Bearing housing
9 Turbine housing
11 Compressor housing
13, 15 Volute
17 Exhaust gas outlet
19 Axis
21 Central region
23 Exhaust gas inlet
25 Exhaust gas routing
27 Tongue
29 Volute outlet gap
31 Outlet direction
33 Connection device
35 Internal wall
37 Convexity
39 Linear portion
41 Length
43 Line
45 Portion
A, B, C, D, τ Parameter

What is claimed is:

1. A turbine housing for an exhaust turbocharger, the turbine housing being configured for receiving a turbine wheel that is rotatable about an axis, the turbine housing comprising:
   an exhaust gas inlet;
   an axial exhaust gas outlet pointing in an outlet direction; and
   a single-flow, spiral exhaust gas routing having a volute and a volute outlet gap being configured so that exhaust gas flows from the volute to the turbine wheel, wherein the exhaust gas routing is fluidically connected to the exhaust gas inlet and is defined by an internal wall of the turbine housing;
   wherein the volute has a portion which encircles the axis and has a convexity of the internal wall, in that the convexity, counter to the outlet direction, extends beyond the volute outlet gap, and in that sectional planes, through which the axis runs, each have a volute contour with a straight linear portion and wherein the straight linear portion conjointly with the axis defines an angle facing the exhaust gas outlet that is less than or equal to 90°; and
   wherein the exhaust gas routing is encircling up to a tongue, and the volute contour in a sectional plane of a tongue end region, through which the axis runs, no longer has a straight linear portion.

2. The turbine housing as claimed in claim 1,
wherein the straight linear portion is a region of the volute contour that faces away from the exhaust gas outlet.

3. The turbine housing as claimed in claim 1,
wherein the straight linear portion runs on a side of a line that faces away from the exhaust gas outlet and that runs along a region of the volute outlet gap contour perpendicularly to the axis.

4. The turbine housing as claimed in claim 3,
wherein the region of the volute outlet gap contour faces away from the exhaust gas outlet.

5. The turbine housing as claimed in claim 1,
wherein the portion which encircles the axis extends in an arcuate manner between a beginning and an end, and wherein the beginning and the end between the axis define an angle of at least 90°.

6. The turbine housing as claimed in claim 5,
wherein the beginning is an exhaust gas routing beginning after the exhaust gas inlet.

7. The turbine housing as claimed in claim 1,
wherein a length of the straight linear portion decreases as the encirclement of the axis increases.

8. The turbine housing as claimed in claim 1,
wherein a depth (D) by way of which the convexity extends beyond the volute outlet gap decreases as the encirclement of the axis increases.

9. The turbine housing as claimed in claim 1,
wherein the volute contour beyond the volute outlet gap and the straight linear portion is radiused.

10. The turbine housing as claimed in claim 1,
wherein the volute outlet gap extends perpendicularly to the axis and encircles the axis in an arcuate manner.

11. The turbine housing as claimed in claim 1,
further comprising a coupling device which is disposed so as to face away from the exhaust gas outlet and is configured for connecting the turbine housing to a bearing housing.

12. The turbine housing as claimed in claim 2,
wherein the straight linear portion runs on a side of a line that faces away from the exhaust gas outlet and that runs along a region of the volute outlet gap contour perpendicularly to the axis.

13. The turbine housing as claimed in claim 12,
wherein the region of the volute outlet gap contour faces away from the exhaust gas outlet.

14. The turbine housing as claimed in claim 2,
wherein the portion which encircles the axis extends in an arcuate manner between a beginning and an end, and wherein the beginning and the end between the axis define an angle of at least 90°.

15. The turbine housing as claimed in claim 1,
wherein the portion which encircles the axis extends in an arcuate manner between a beginning and an end, and wherein the beginning and the end between the axis define an angle of at least 120°.

* * * * *